(12) United States Patent
Sutterfield et al.

(10) Patent No.: US 6,382,559 B1
(45) Date of Patent: May 7, 2002

(54) THRUST VECTORING MECHANISM (75) Inventors: David Levi Sutterfield, Greenwood; Von David Baker, Indianapolis, both of IN (US); Jagdish Singh Sokhey, Loveland, OH (US)

(73) Assignees: Rolls-Royce Corporation; Allison Advanced Development Company, both of Indianapolis, IN (US)

( * ) Notice: Subject to any disclaimer, the term of this patent is extended or adjusted under 35 U.S.C. 154(b) by 0 days.

(21) Appl. No.: 09/480,431

(22) Filed: Jan. 11, 2000

Related U.S. Application Data (60) Provisional application No. 60/148,926, filed on Aug. 13, 1999.

(51) Int. Cl.[7] .......................... B64C 29/00; B64C 15/12
(52) U.S. Cl. ................... 244/23 A; 244/23 D; 244/12.4
(58) Field of Search ............................... 244/12.5, 12.4, 244/23 D, 23 A; 60/226.2, 228, 232

(56) References Cited

U.S. PATENT DOCUMENTS

| | | | |
|---|---|---|---|
| 1,018,581 A | 2/1912 | Marchant et al. | |
| 2,502,045 A | 3/1950 | Johnson | 244/12 |
| 2,879,014 A | 3/1959 | Smith et al. | 244/12 |
| 2,926,869 A | * 3/1960 | Sullivan | 244/12.5 |
| 2,930,544 A | 3/1960 | Howell | 244/12 |
| 2,989,269 A | 6/1961 | Le Bel | 244/12 |
| 3,099,423 A | 7/1963 | Wilde et al. | 244/23 |
| 3,151,446 A | 10/1964 | Parilla | 60/35.6 |
| 3,179,353 A | 4/1965 | Peterson | 244/12 |
| 3,206,929 A | 9/1965 | Marchant et al. | 60/35.55 |
| 3,299,638 A | 1/1967 | Santamaria et al. | 60/204 |
| 3,358,453 A | 12/1967 | Swet | 60/225 |
| 3,380,660 A | 4/1968 | Markowski | 239/265.27 |
| 3,397,852 A | 8/1968 | Katzen | 244/12 |
| 3,475,912 A | 11/1969 | Angier | 60/222 |
| 3,490,236 A | 1/1970 | Markowski | 60/204 |
| 3,528,247 A | 9/1970 | Riemerschmid | 60/232 |
| 3,545,209 A | 12/1970 | Millward | 60/226 |
| 3,581,995 A | 6/1971 | Fischer | 239/265.19 |
| 3,625,432 A | 12/1971 | Bragg | 239/265.35 |
| 3,640,469 A | 2/1972 | Hayes et al. | 239/265.35 |
| 3,704,829 A | 12/1972 | Hall | 239/265.35 |
| 3,835,643 A | 9/1974 | De Garcia, Jr. et al. | 60/230 |
| 3,912,201 A | 10/1975 | Bradbury | 244/23 |
| 4,000,610 A | 1/1977 | Nash et al. | 60/230 |
| 4,018,046 A | 4/1977 | Hurley | 60/264 |
| 4,162,040 A | 7/1979 | Carey | 239/265.33 |
| 4,205,813 A | 6/1980 | Evans et al. | 244/12.5 |

(List continued on next page.)

FOREIGN PATENT DOCUMENTS

DE      1 210 259      2/1966

OTHER PUBLICATIONS

Purported English Translation of German Patent No. 1,210, 259, Issued Feb. 3, 1966.

Primary Examiner—Charles T. Jordan
Assistant Examiner—Christian M. Best
(74) Attorney, Agent, or Firm—Woodard, Emhardt, Naughton, Moriarty & McNett (57) ABSTRACT

A thrust vectoring mechanism to vector thrust and control discharge throat area includes four or more vanes mounted across the outlet of a nozzle in a cascade arrangement. The mechanism further includes a rod to control pivoting of each of the vanes that may be selectively rotated with one or more actuators. The rod includes threading. The vanes each include a drive member that is either toothed to engage the rod threading or defines a camming relationship with a coupling member threaded on the rod. The rod threading, drive members, and coupling members may be arranged to define different pivoting schedules for each of the vanes so that a generally constant throat area may be maintained over a given vector directional range of the vanes. The outlet may be generally rectangular in cross-section and a strut may be mounted across the outlet perpendicular to the pivot axes of the vanes to house the rod, drive members, and/or coupling members.

40 Claims, 9 Drawing Sheets

U.S. PATENT DOCUMENTS

| | | | |
|---|---|---|---|
| 4,226,084 A | 10/1980 | Spears, Jr. | 60/262 |
| 4,241,876 A | 12/1980 | Pedersen | 239/265.27 |
| 4,280,660 A | 7/1981 | Wooten, Jr. et al. | 239/265.35 |
| 4,474,345 A | 10/1984 | Musgrove | 244/53 |
| 4,587,804 A | 5/1986 | Horinouchi et al. | 60/230 |
| 4,587,806 A | 5/1986 | Madden | 60/271 |
| 4,606,499 A | 8/1986 | Langley, Jr. | 239/11 |
| 4,660,767 A | 4/1987 | Scrace | 239/265.35 |
| 4,798,328 A | 1/1989 | Thayer et al. | 239/1 |
| 4,805,401 A | 2/1989 | Thayer et al. | 60/226.2 |
| 4,828,203 A | 5/1989 | Clifton et al. | 244/12.3 |
| 4,836,451 A | 6/1989 | Herrick et al. | 239/265.27 |
| 4,922,711 A | 5/1990 | Brown | 60/204 |
| 4,948,072 A | 8/1990 | Garland et al. | 244/23 |
| 5,039,014 A | 8/1991 | Lippneier | 239/265.39 |
| 5,050,803 A | 9/1991 | Wakeman et al. | 239/265.35 |
| 5,062,588 A * | 11/1991 | Garland | 244/23 D |
| 5,142,862 A | 9/1992 | Brown | 60/226.2 |
| 5,209,428 A | 5/1993 | Bevilaqua et al. | 244/12.3 |
| 5,211,008 A | 5/1993 | Fage | 60/226.2 |
| 5,221,048 A | 6/1993 | Lair | 239/265.37 |
| 5,294,055 A | 3/1994 | Garrett et al. | 239/265.19 |
| 5,295,643 A * | 3/1994 | Ebbert et al. | 244/12.5 |
| 5,328,098 A | 7/1994 | Barcza et al. | 239/265.35 |
| 5,390,877 A | 2/1995 | Nightingale | |
| 5,464,175 A | 11/1995 | Short | 244/12.5 |
| 5,485,958 A | 1/1996 | Nightingale | 239/265.19 |
| 5,505,407 A * | 4/1996 | Chiappetta | 244/12.5 |
| 5,522,546 A | 6/1996 | Jarvis | 295/265.19 |
| 5,571,262 A | 11/1996 | Camboulives | 239/265.19 |
| 5,630,564 A | 5/1997 | Speicher et al. | 244/3.24 |
| 5,687,907 A | 11/1997 | Holden | 239/265.35 |
| 5,690,280 A | 11/1997 | Holowach et al. | 239/265.25 |
| 5,694,766 A | 12/1997 | Smereczniak et al. | 60/204 |
| 5,706,649 A | 1/1998 | Robinson et al. | 60/226.2 |
| 5,740,988 A | 4/1998 | Ausdenmoore | 244/52 |
| 5,769,317 A | 6/1998 | Sokhey et al. | 239/1 |
| 6,105,901 A * | 8/2000 | Ulanski et al. | 244/23 A |
| 6,113,029 A * | 9/2000 | Salinas | 244/23 D |

* cited by examiner

THRUST VECTORING MECHANISM

CROSS-REFERENCE TO RELATED APPLICATIONS

This application claims the benefit of U.S. Provisional Patent Application Ser. No. 60/148,926, filed on Aug. 13, 1999; and is related to co-pending U.S. patent application Ser. No. 09/246,426, filed on Feb. 8, 1999 and co-pending U.S. patent application Ser. No. 09/055,663, filed on Apr. 6, 1998.

GOVERNMENT RIGHTS

The U.S. Government has a paid-up license in this invention and the right in limited circumstances to require the patent owner to license others on reasonable terms as provided for by the terms of Contract No. N00019-97-C0038 awarded by the Department of Defense.

BACKGROUND OF THE INVENTION

The present invention relates to thrust vectoring techniques, and more particularly, but not exclusively, relates to techniques to control thrust vectoring and nozzle throat area with variable pitch guide vanes.

With the advent of Vertical or Short Take-Off and Vertical Landing (V/STOVL) aircraft, a need has arisen for uninterrupted vectoring of thrust generated by the discharge of working fluid. One way to provide such thrust vectoring is with a cascade of individually pivotable vanes that selectably divert the working fluid as it is discharged from a nozzle. The hot gasses exhausted from a gas turbine engine are one source of working fluid which may be vectored in this manner. Alternatively or additionally, a lift fan that is driven indirectly by a coupling to a gas turbine engine may be utilized to provide a "cold flow" working fluid source. U.S. Pat. No. 5,209,428 to Bevilaqua et al. is cited as a source of further information concerning this type of lift fan.

For the V/STOVL mode of aircraft operation, a continuous vectoring of thrust is required throughout a wide angular range to provide lift for the aircraft. Also, a smooth transition to a horizontal cruise mode is often required. Moreover, as with most aircraft equipment, thrust vectoring systems generally must be lightweight, reliable, and compact, occupying as little space as possible. U.S. Pat. No. 5,769,317 to Sokhey et al.; U.S. Pat. No. 5,485,958 to Nightingale; U.S. Pat. No. 4,798,328 to Thayer et al.; U.S. Pat. No. 3,640,469 to Hayes et al.; U.S. Pat. No. 3,397,852 to Katzen; U.S. Pat. No. 3,179,353 to Peterson; and U.S. Pat. No. 2,989,269 to Le Bel illustrate various arrangements for vectoring thrust.

One typical drawback of these systems is the inability to selectively adjust the exit area presented to working fluid as it passes through the vanes while simultaneously and independently deflecting the exiting working fluid to vector thrust. The ability to select the working fluid exit area or throat area generally improves vectoring system efficiency. In particular, for vane cascades, it is often desirable that the collective exhaust gas flow area through the vanes be held nearly constant in order to avoid inducing instability in the operation of the gas turbine engine. For cascade vanes pivoting in unison to vector thrust, it will be appreciated that the nozzle outlet area measured normal to the flow of gas from the vectoring cascade will be a function of the sine of the vane angle. Thus, the throat area defined by cascade vanes positioned at a 45 degree angle with respect to the nominal gas flow direction will be approximately 70% of the throat area defined by the vanes when oriented parallel to the nominal gas flow. This nearly 30% difference in throat area can result in performance variations that may be difficult to reliably counteract during V/STOVL maneuvering.

One approach to this problem is to simultaneously adjust vectoring and throat area by using an independently controllable actuator for each vane in the cascade. Unfortunately, this approach is often impractical because of the attendant increase in weight, complexity, and space required for the separate actuators. Thus, needs remain for further advancements in thrust vectoring technology—especially in the area of multiple vane vectoring techniques.

SUMMARY OF THE INVENTION

One form of the present invention is a unique thrust vectoring system. Other forms include unique systems and methods to position a number of vanes with a rotary drive mechanism to vector thrust.

Another form includes an aircraft defining an outlet for discharging a working fluid to produce thrust and a number of vanes pivotably coupled across this outlet to vector the thrust. Also included is a rod rotatable to pivot the vanes in accordance with threading defined along the rod.

Still another form includes a thrust vectoring mechanism with a number of vanes and a threaded rod. The rod is coupled to a vane control member that engages one of the vanes in a camming relationship. Alternatively or additionally, the rod may engage teeth of a drive member connected to another of the vanes.

Yet another form of the present invention includes an aircraft with a thrust vector mechanism that includes a number of vanes and a rod. Also included are a corresponding number of vane control members that each engage a different portion of the rod. This engagement is provided by threading, teeth, or both. The vane connection members move in response to rotation of the rod and correspondingly pivot each of the vanes.

In a further form, a unique thrust vectoring nozzle includes a number of vanes and a rod interconnecting the vanes. The vanes pivot in unison in a common rotational direction (i.e., clockwise or counter-clockwise) in response to rotation of the rod. For this form, the pivoting of each vane is scheduled to control nozzle throat area. For example, this throat area control may reduce variation in the nozzle's discharge coefficient with changes in vane orientation, and correspondingly reduce attendant changes in effective throat area of the nozzle.

Further embodiments, objects, advantages, features, benefits, forms, and aspects of the present invention will become apparent from the drawings and description provided herein.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates.

Figure 1:
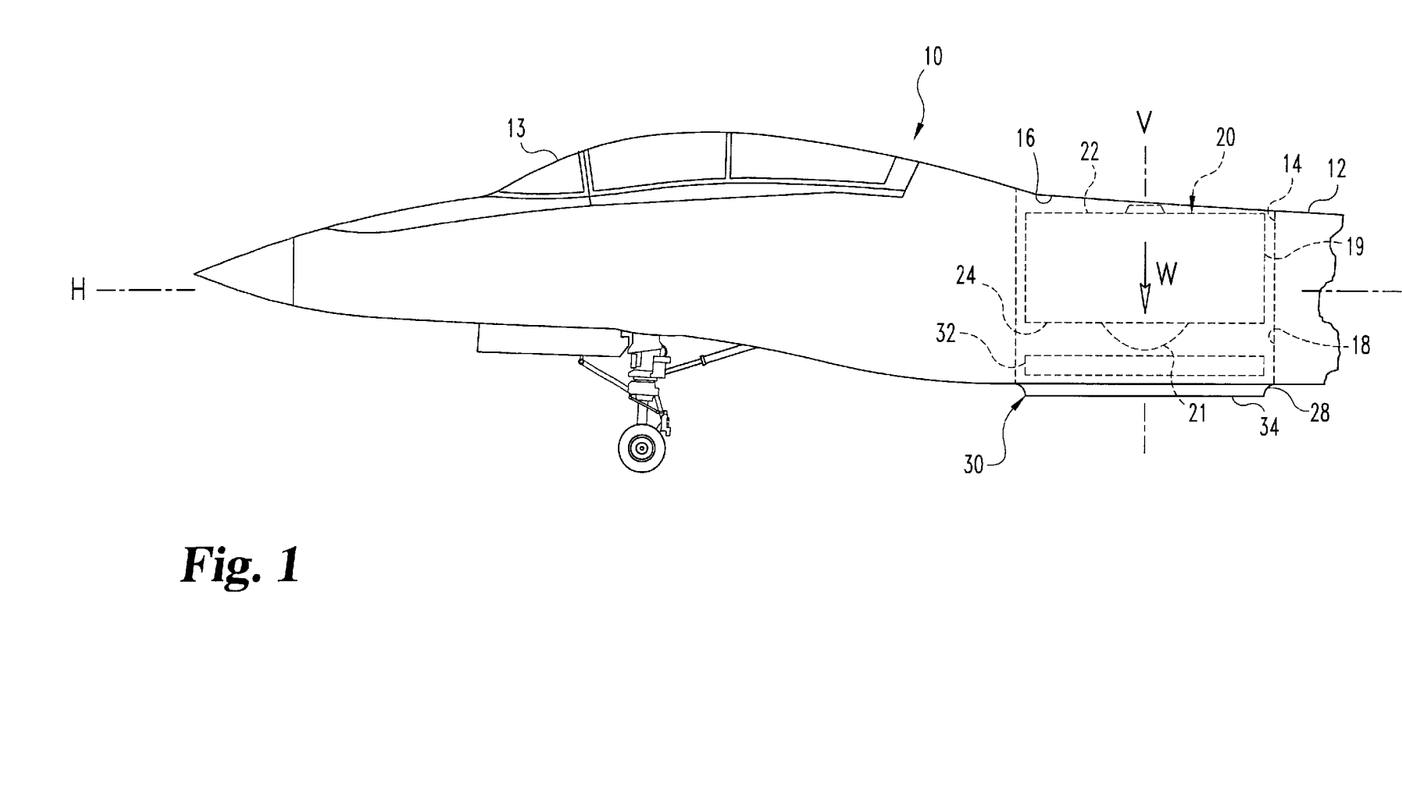
FIG. 1 is a partial diagrammatic view of an aircraft with a thrust vectoring system.

FIG. 1 illustrates a partial view of aircraft 10, showing fuselage 12 and cockpit 13. Horizontal axis H and vertical axis V are illustrated in FIG. 1 relative to aircraft 10 in an nominal orientation for a level cruise or hover mode of aircraft operation, or when aircraft 10 is parked on level ground. An aft portion of aircraft 10 is not shown, being of a conventional nature such as the aircraft shown in U.S. Pat. No. 5,209,428 to Bevilaqua et al. or U.S. Pat. No. 5,769,317 to Sokhey et al.

Aircraft 10 includes thrust vectoring system 30. System 30 includes cavity 14 defined through fuselage 12. Cavity 14 has intake opening 16 and discharge passage 18 that terminates with outlet 34. System 30 also includes thrust vectoring nozzle 28 that at least partially defines passage 18. Thrust vectoring mechanism 32 of system 30 is schematically illustrated in phantom within nozzle 28. Furthermore, system 30 comprises working fluid source 19 in the form of lift fan 20 shown within cavity 14 in phantom. Lift fan 20 has inlet 22 and opposing working fluid exit 24. Lift fan 20 is illustrated with centerbody 21 (also shown in phantom) extending into passage 18. In one example, lift fan 20 is a gas turbine engine, which discharges a working fluid through exit 24 along the direction indicated by arrow W to provide thrust. In another example, lift fan 20 is of the cold flow type, being powered by a gas turbine engine or other power source by a mechanical linkage (not shown). In further examples, other types of aircraft thrust sources may be employed.

Figure 2:
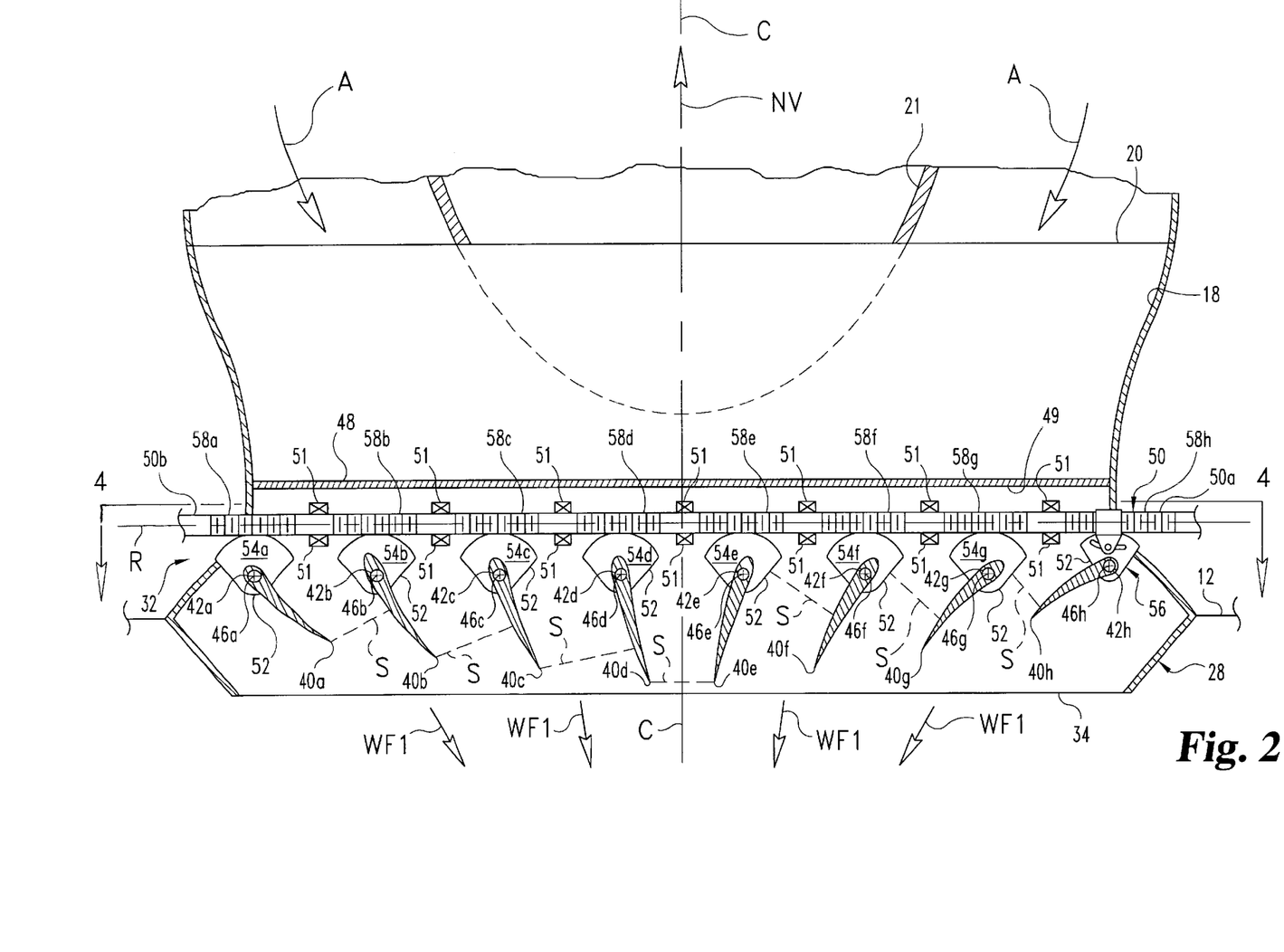
FIG. 2 is a partial sectional, side view of the thrust vectoring mechanism for the system of FIG. 1 with the mechanism vanes in a first vectoring orientation.
Figure 3:
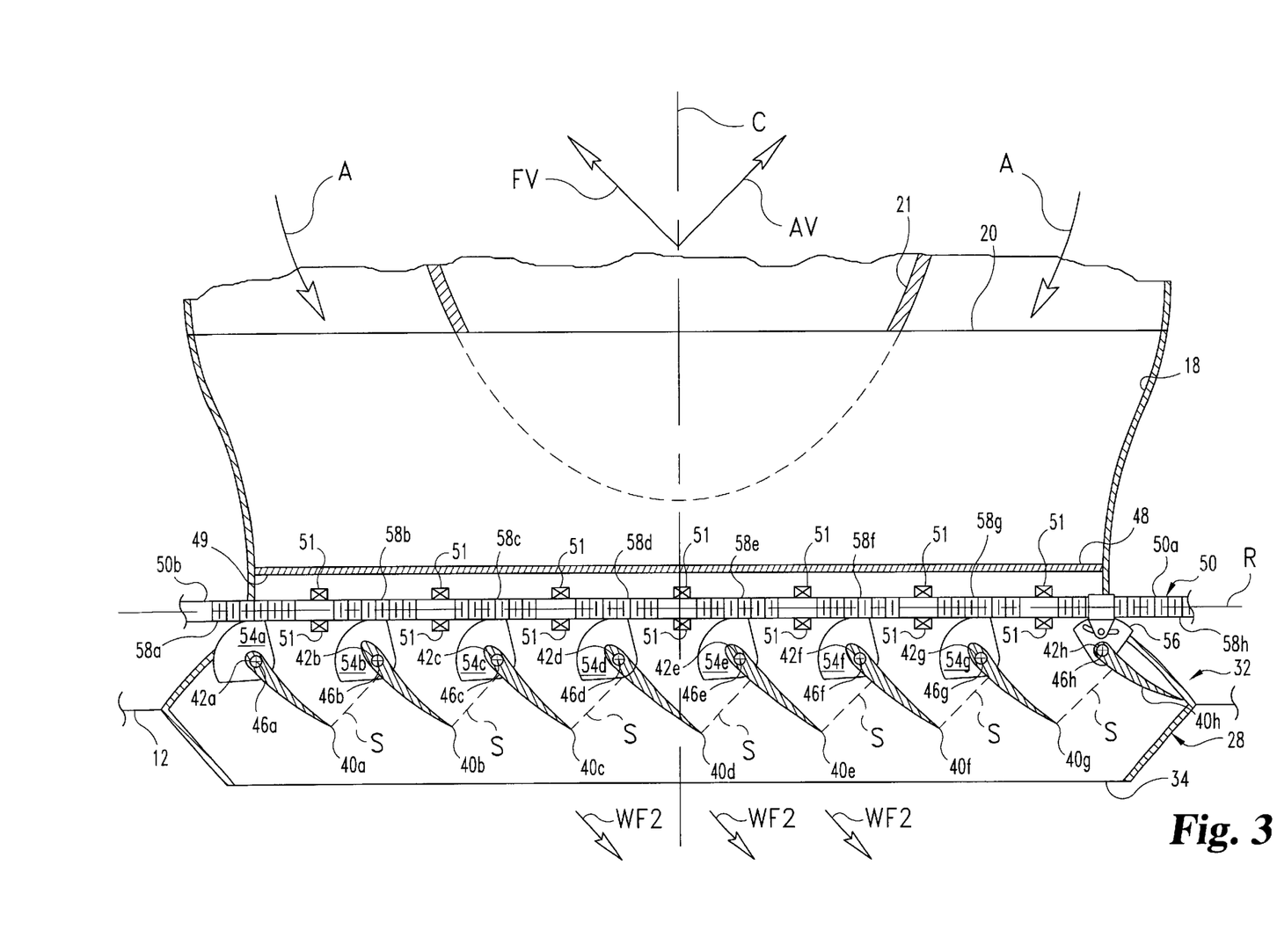
FIG. 3 is a partial sectional, side view of the thrust vectoring mechanism for the system of FIG. 1 with the mechanism vanes in a second vectoring orientation.

Thrust vectoring nozzle 28 receives working fluid flowing along arrow W from source 19 and discharges it through outlet 34. Referring additionally to FIGS. 2 and 3, further details of thrust vectoring mechanism 32 are depicted in a partial sectional view; where the view plane of each of FIGS. 2 and 3 is generally parallel to the view plane of FIG. 1. FIGS. 2 and 3 illustrate centerline axis C of thrust vectoring nozzle 28, lift fan 20 and centerbody 21. Lift fan 20 and centerbody 21 each have a generally circular cross-section taken along centerline axis C. For the orientation of aircraft 10 shown in FIG. 1, centerline axis C is generally coincident with vertical axis V.

Thrust vectoring mechanism 32 includes a number of variable pitch vanes 40a, 40b, 40c, 40d, 40e, 40f, 40g, 40h (collectively designated vanes 40) shown in section in FIGS. 2 and 3. The orientation of vanes 40 is controlled to direct the flow of working fluid as it exits outlet 34. FIGS. 2 and 3 each show a different orientation of vanes 40 corresponding to two different thrust vector directions, as represented by arrows NV and FV, respectively. The corresponding direction of working fluid flow as it exits outlet 34 is illustrated with arrows WF1 in the case of thrust vector NV (FIG. 2) and arrows WF2 in the case of thrust vector FV (FIG. 3).

Vanes 40 preferably span across outlet 34 and are airfoil-shaped in a manner configured to provide a desired thrust efficiency and thrust directing capability. Vanes 40 are each pivotally mounted to aircraft 10 by a corresponding mounting shaft 42a, 42b, 42c, 42d, 42e, 42f, 42g, 42h (collectively referred to as shafts 42). Each shaft 42 is journaled to aircraft 10 adjacent each opposing end of the corresponding vane 40 by a suitable pair of journal bearings within opposing wall portions of nozzle 28. Vanes 40 each pivot about a corresponding pivot axis 46a, 46b, 46c, 46d, 46e, 46f, 46g, 46h (collectively referred to as pivot axes 46). Pivot axes 46 are generally perpendicular to axis C and the view planes of FIGS. 2 and 3, and are accordingly represented by cross hairs. In one embodiment, vanes 40 are provided in a cascade arrangement with pivot axes 46 being generally parallel and evenly spaced apart relative to one another. In other embodiments, the spacing, number, size, shape and relative positioning of vanes 40 may vary as would occur to those skilled in the art.

Thrust vectoring mechanism 32 also includes center strut 48 that spans across passage 18. Center strut 48 is shown in a partial sectional form in FIGS. 2 and 3. Strut 48 defines chamber 49. Chamber 49 houses drive or control rod 50 of thrust vectoring mechanism 32. Rod 50 is arranged to rotate about rotational axis R and is journaled to strut 48 by bearings 51. During rotation about rotational axis R, rod 50 is arranged so that it stays in generally the same translational position along rotational axis R. Pivot axes 46 of vanes 40 each cross rotational axis R of rod 50, and are each generally perpendicular to rotational axis R.

Thrust vectoring mechanism 32 also includes a number of vane control members 52 of various types that are schematically shown in FIGS. 2 and 3. Vane control members 52 are also at least partially housed in chamber 49 of strut 48. Vane control members 52 include toothed drive members 54a, 54b, 54c, 54d, 54e, 54f, 54g (collectively designated drive members 54) that are fixed to mounting shaft 42a, 42b, 42c, 42d, 42e, 42f, 42g of vanes 40a, 40b, 40c, 40d, 40e, 40f, 40g, respectively. Toothed drive members 54 each have a generally sector-shaped profile with a toothed, arcuate rim. By being fixed in relation to vanes 40a, 40b, 40c, 40d, 40e, 40f, 40g; drive members 54 are arranged to pivot therewith. Vane control members 52 also comprise members of coupling assembly 56. Assembly 56 couples vane 40h to rod 50. Rod 50 has end portion 50a opposing end portion 50b. A number of threaded segments or portions 58a, 58b, 58c, 58d, 58e, 58f, 58g, 58h are defined along rod 50 (collectively designated threaded portions 58). In one embodiment, one or more of threaded portions 58 are integrally formed on rod 50. In another embodiment, one or more of threaded portions 58 are provided in the form of a sleeve interconnected to other threaded portions 58 by an elongate member to collectively provide rod 50. In other embodiments, different arrangements of rod 50 or formation techniques for rod 50 are envisioned as would occur to those skilled in the art. Each of threaded portions 58 cooperates with at least one of vane control members 52 to pivot vanes 40 in response to movement of rod 50 as will be more fully explained hereinafter.

Figure 4:
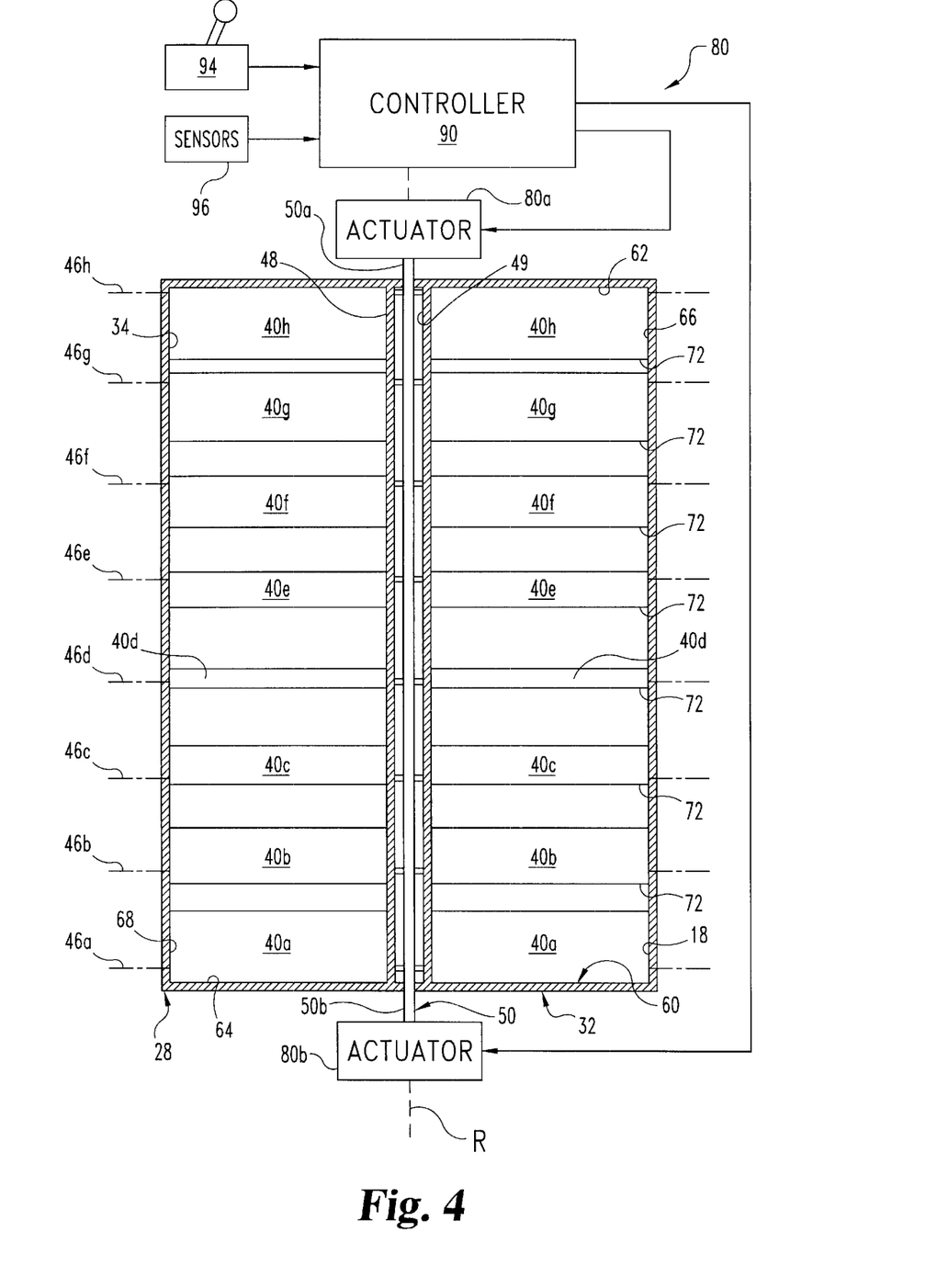
FIG. 4 is a partial sectional, top view of the thrust vectoring mechanism taken along section line 4—4 shown in FIG. 2.

Referring additionally to FIG. 4, a partial sectional, top view of thrust vectoring nozzle 28 taken along section line 4—4 of FIG. 2 is illustrated, with the view plane of FIG. 4 being generally normal to axis C and the view planes of FIGS. 2 and 3. In FIG. 4, an upper portion of strut 48 is cutaway and upper bearings 51 for rod 50 of thrust vectoring mechanism 32 are not illustrated to preserve clarity. While mounting shafts 42 are viewable through the cutaway portion of strut 48 in FIG. 4, they are not specifically designated also to preserve clarity. Nozzle 28 has wall portion 62 opposing wall portion 64, and wall portion 66 opposing wall portion 68. Rod 50 extends through an opening in each opposing wall portion 62, 64. Typically, a journal bearing is provided in each of these openings (not shown) to establish a rotary bearing relationship between rod 50 and opposing wall portions 62, 64 and generally maintain translational position of rod 50 along axis R. Opposing wall portions 66, 68 define a number of pairs of opposing openings (not shown) each corresponding to a different one of mounting shafts 42. Each mounting shaft 42 extends through the corresponding pair of opposing openings in wall portions 66, 68. Typically, a journal bearing is provided in each of these opening pairs (also not shown) to establish a rotary bearing relationship between each of mounting shafts 42 and opposing wall portions 66, 68.

From FIG. 4, it should be understood that nozzle 28 has a generally rectangular cross-section and corresponding margin 60 defined by opposing wall portions 62, 64 and opposing wall portions 66, 68. Accordingly, outlet 34 is generally rectangular and has generally rectilinear working fluid discharge regions between vanes 40 as are designated by reference numeral 72. In contrast, at exit 24 of lift fan 20, passage 18 has a generally circular boundary for this embodiment. The circular profile of passage 18 gradually transitions to rectangular margin 60 relative to a path from exit 24 to outlet 34 along axis C. U.S. patent application Ser. No. 09/055,663, filed on Apr. 6, 1998, is cited as a source of additional information concerning this type of circular-to-rectilinear passageway transition. It should be appreciated that a generally rectangular profile for outlet 34 can facilitate the application of less complex vane shapes and more efficient nozzle operation. Nonetheless, in other embodiments, passage 18 may maintain its circular profile from exit 24 through outlet 34 or may be shaped differently as would occur to those skilled in the art.

FIG. 4 also schematically depicts control system 80. Control system 80 includes rotary actuators 80a, 80b each coupled to rod 50. Actuator 80a selectively rotates rod 50 in a first rotational direction about axis R and actuator 80b selectively rotates rod 50 about axis R in a second rotational direction opposite the first rotational direction. Actuators 80a, 80b may be electromagnetic, hydraulic, pneumatic, a combination of one or more of these types, or such other variety as would occur to those skilled in the art. Alternatively, a single actuator capable of rotation in either rotational direction can be used. In still another embodiment, one or more dedicated actuators may not be required.

Control System 80 also includes controller 90 operably coupled to actuators 80a, 80b. Controller 90 is arranged to activate actuators 80a, 80b by supplying one or more output signals thereto. Controller 90 may be comprised of one or more components configured as a single unit. Alternatively, when of a multi-component form, controller 90 may have one or more components remotely located relative to the others. Controller 90 may be programmable, a state logic machine or other type of dedicated hardware, or a hybrid combination of programmable and dedicated hardware. One or more components of controller 90 may be of the electronic variety defining digital circuitry, analog circuitry, or both. As an addition or alternative to such circuitry, controller 90 may include one or more electric, electromagnetic, mechanical, hydraulic, pneumatic, or optical elements desired to interface/control actuators 80a, 80b.

In one embodiment including electronic circuitry, controller 90 has one or more integrated, semiconductor digital processors operatively coupled to one or more solid-state, semiconductor digital memories. For this embodiment, at least a portion of a memory contains programming to be executed by a processor and is arranged for reading and writing of data in accordance with one or more processor routines. Besides memory, controller 90 may also include any oscillators, control clocks, interfaces, signal conditioners, filters, limiters, Analog-to-Digital (A/D) converters, Digital-to-Analog (D/A) converters, communication ports, or other types of electronic circuits as would occur to those skilled in the art to implement the present invention.

Besides output devices such as actuators 80a, 80b; controller 90 is also operatively coupled to a number of input devices including pilot control 94 and sensors 96. Pilot control 94 and sensors 96 can each provide a signal in either a digital or analog format compatible with associated equipment. Correspondingly, equipment coupled to pilot control 94 and sensors 94 is configured to condition and convert sensor signals to the appropriate format, as required.

Figure 5:
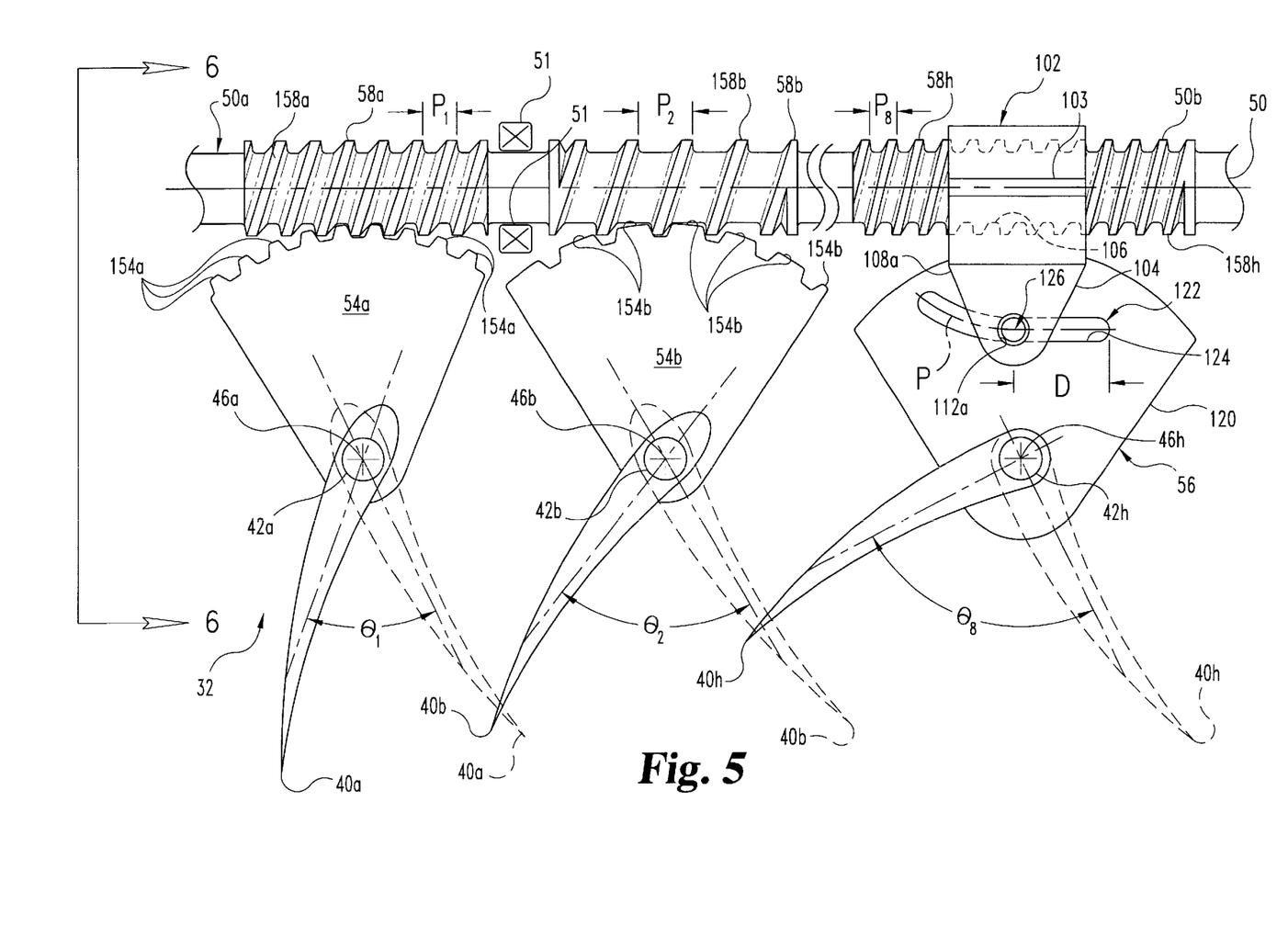
FIG. 5 is a partially broken side view, in section, of a portion of the thrust vectoring mechanism.

FIG. 5 depicts mechanical details of a portion of thrust vectoring mechanism 32 in greater detail, having a view plane parallel to the view planes of FIGS. 2 and 3. Specifically, rod 50 is shown in broken form with threaded portions 58a, 58b, 58h. Threaded portions 58a, 58b, 58h each having threading 158a, 158b, 158h with a different pitch, designated as pitches $P_1$, $P_2$, and $P_8$, respectively. Threadings 158a, 158b, 158h each engage a corresponding vane control member 52. Threading 158a engages teeth 154a of toothed drive member 54a and threading 158b engages teeth 154b of toothed drive member 54b. Teeth 154a of drive member 54a are generally radially distributed along its arcuate rim and are generally evenly spaced apart from each other. Teeth 154b of drive member 54b are generally uniformly and evenly spaced apart, and are also radially distributed along its arcuate rim. However, there are fewer teeth 154b for toothed drive member 54b compared to teeth 154a of toothed drive member 54a because teeth 154b have a greater angular separation from one to the next in order to mesh with the differently pitched threading 158b compared to threading 158a meshed with teeth 154a.

Figure 6:
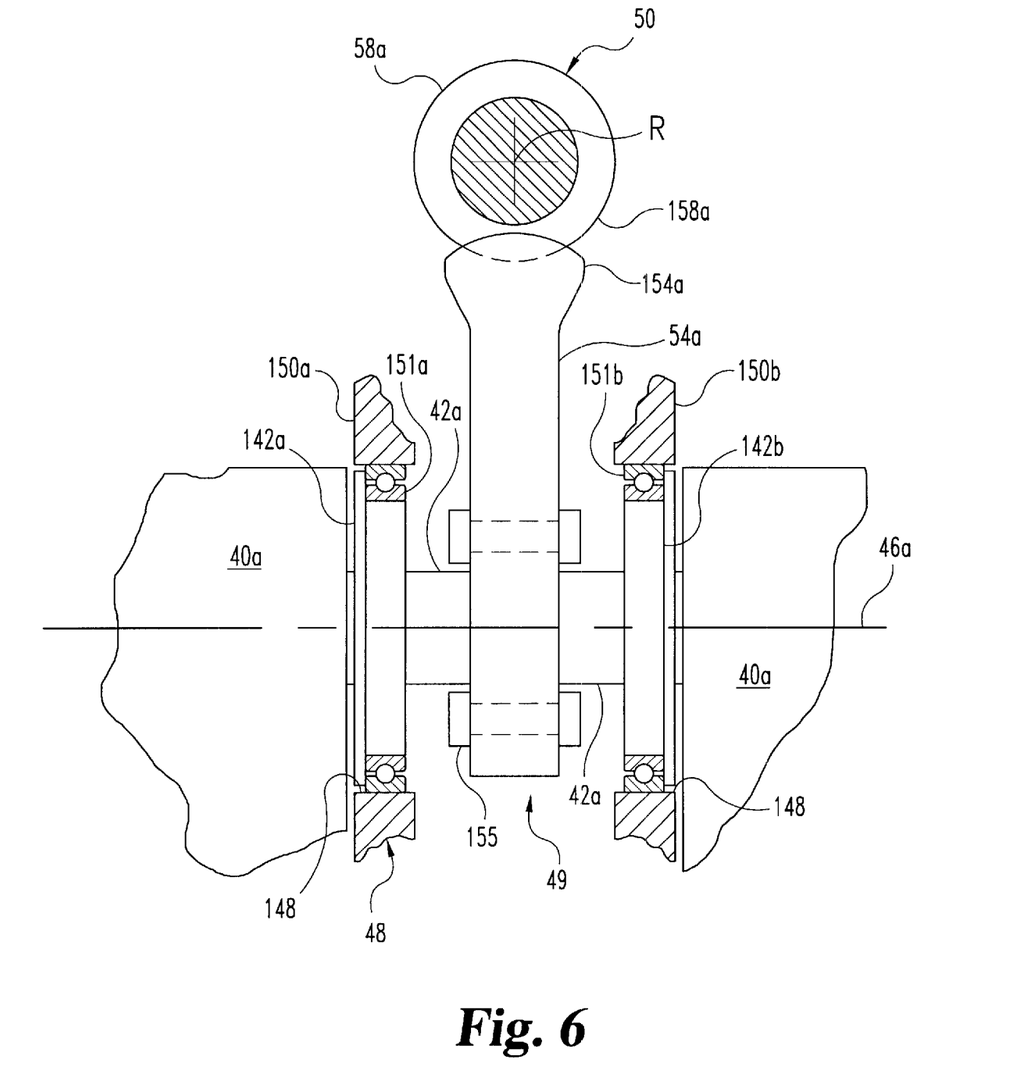
FIG. 6 is a partial side view taken along the view line 6—6 shown in FIG. 5.

Referring additionally to FIG. 6, a partial, sectional view corresponding to the view line 6—6 of FIG. 5 is illustrated showing further aspects of the tooth/thread engagement between drive member 54a and rod 50. Also, a portion of strut 48 is depicted in FIG. 6 that is not shown in FIG. 5. Strut 48 has opposing walls 150a, 150b defining mounting openings 148. Shaft 42a of vane 40a extends through openings 148 and rotatably engages walls 150a, 150b with bearings 151a, 151b, respectively. Shaft 42a includes bearing flanges 142a, 142b that engage bearings 151a, 151b, respectively. Bearings 151a, 151b are depicted as being of a ball/race type, but any other type of bearing can be used as would occur to those skilled in the art. Drive member 54a is fixed to shaft 42a, and in turn fixed in relation to vane 40a, by one or more fasteners 155. Fasteners 155 may be in the form of a bolt/nut, screw, or such other type of fastener as would occur to those skilled in the art. The engagement of one of teeth 154a with threading 158a is illustrated in FIG.

6; where a portion of threading 158a is shown in phantom. Rotational axis R of rod 50 extends generally perpendicular to the view plane of FIG. 6 and is represented by cross-hairs.

Vanes 40b–40g and toothed drive members 54b–54g are fastened together and mounted to strut 48 to engage rod 50 in a like manner relative to vane 40a and drive member 54a. Furthermore, although shown schematically in FIGS. 2–3, drive members 54c–54g likewise include teeth engaged by threading of threaded portions 58c–58g in a manner like that shown for drive members 54a, 54b and threaded portions 58a, 58b in FIG. 5. Threaded portions 58a–58h may each have threading with a pitch that is different relative to the others, or two or more can have generally the same pitch as more fully explained hereinafter.

Figure 7:
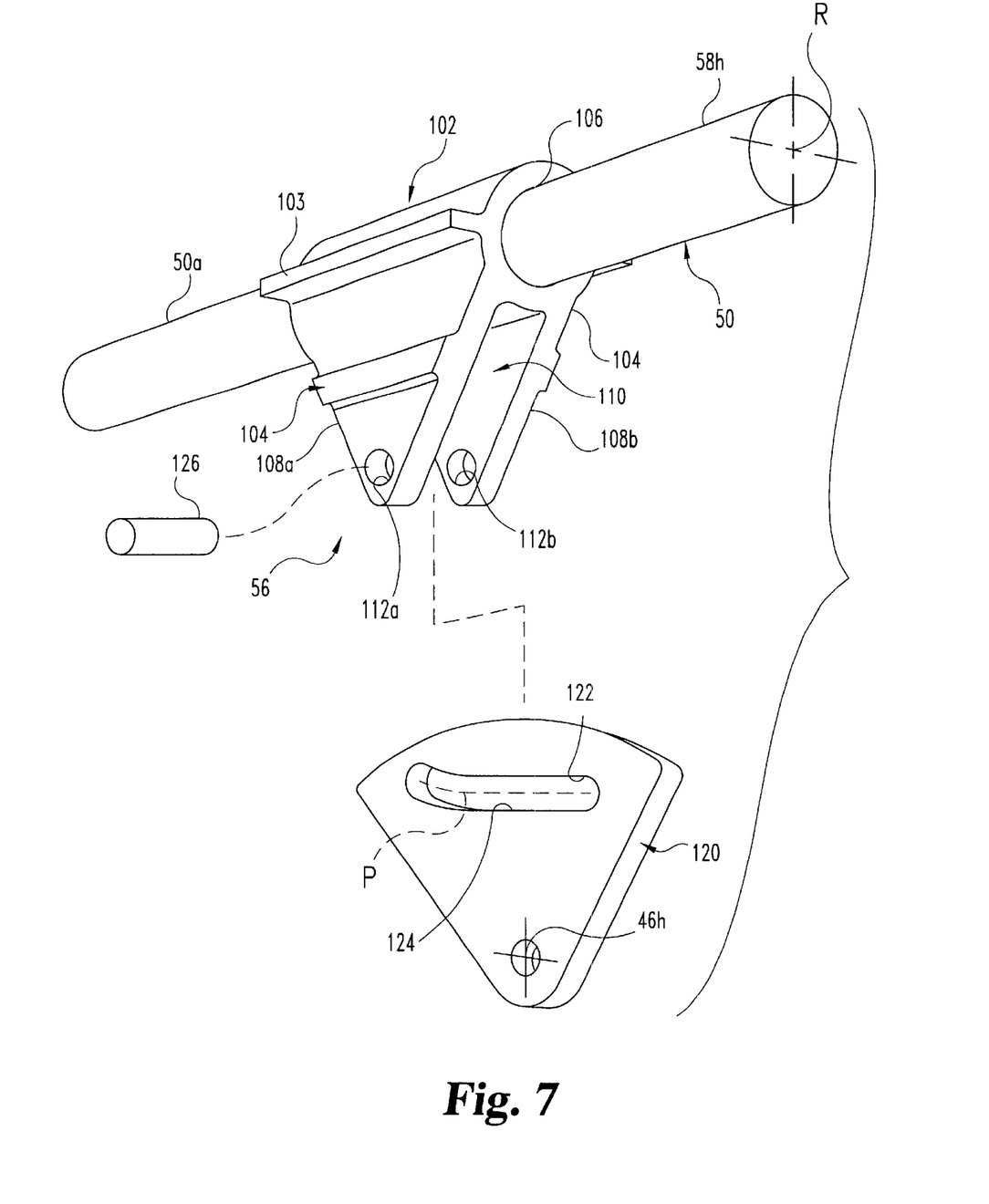
FIG. 7 is a partial, exploded assembly view of a portion of the thrust vectoring mechanism shown in FIGS. 2–4.

Referring to FIGS. 5 and 7, coupling assembly 56 is further described. FIG. 7 is a partial exploded assembly view of coupling assembly 56. Threading 158h and vane 40h are not shown in FIG. 7 to preserve clarity; however, cross hairs representative of pivot axis 46h are illustrated. Coupling assembly includes coupling member 102 that has body 104 defining threaded passage 106 therethrough (shown in phantom). Accordingly, rod 50 is threaded through passage 106. Coupling member 102 includes two opposing flanges 108a, 108b that define channel 110. Flanges 108a, 108b define mounting apertures 112a, 112b intersecting channel 110.

Coupling assembly 56 also includes drive member 120 engaging channel 110. Drive member 120 defines a cam slot 122 bounded by camming surface 124. While drive member 120 has generally the same shape as drive members 54, it need not define teeth for engaging threading 158h as will become apparent from the following description. Follower 126 in the form of a pin or roller extends through slot 122 when channel 110 receives drive member 120. Opposing ends of follower 126 pass into apertures 112a, 112b to be coupled to flanges 108a, 108b of coupling member 102. Coupling member 102 also includes axial, anti-rotation flanges 103 arranged to engage internal slots or rails of strut 48 (not shown) as more fully explained in connection with the following description of the operation of thrust vectoring mechanism 32.

Referring generally to FIGS. 1–7, operation of aircraft 10 with thrust vectoring system 30 is next described. During operation of thrust vectoring system 30, lift fan 20 is activated to draw working fluid, typically air, through opening 16 and intake 22 in the direction of arrow W. Lift fan pressurizes the working fluid passing through intake 22 and discharges it through exit 24. The pressurized working fluid continues through passage 18 along arrow W, as represented by arrows A in FIGS. 2 and 3. Accordingly, the working fluid passes through thrust vectoring nozzle 28 between vanes 40 and discharges through outlet 34.

By pivoting vanes 40 in a coordinated manner, the direction of discharge of the working fluid from outlet 34 can be changed. As a result, the directional component of thrust (opposite the direction of the working fluid) may be changed. For the orientation of vanes 40 in FIG. 2, a generally "neutral" vector is provided as represented by arrow NV. Thrust vector NV has a directional component generally coincident with centerline axis C. In contrast, for the orientation of vanes 40 in FIG. 3, a forward thrust vector is provided as represented by arrow FV. Also shown is arrow AV that represents an aft thrust vector. While thrust vector NV generally has only a vertical component, thrust vectors FV, AV each typically have both vertical and horizontal components. Frequently, thrust vectors FV, AV are selected for transition from a take-off or landing mode (V/STOVL modes) to a cruise mode. In the cruise mode, aircraft 10 travels predominately along H axis and is typically propelled by a thrust source (not shown) other than thrust source 19.

In addition to providing a thrust vector direction range, it is often desirable to control throat area over that range. Typically, the desired throat area control requires that one or more of vanes 40 pivot by a different amount relative to the others. The two vane orientations shown in FIGS. 2 and 3 provide one nonlimiting illustration of different degrees of pivoting from one vane 40 to the next to provide a selected throat area schedule during thrust vectoring. In FIGS. 2 and 3, each illustrated vane orientation has a number of broken line segments S between vanes 40. For each figure, segments S collectively represent the geometric throat area of thrust vectoring nozzle 28. The additive length of segments S for FIG. 2 are about the same as the additive length of segments S for FIG. 3 indicating for this example that the geometric throat areas for thrust vector NV and AV are about the same.

Referring to FIG. 5, the different degrees of vane pivoting from one to the next to provide thrust vectors NV and AV is best illustrated. In FIG. 5, solid lines represent vanes 40a, 40b, 40h in the position shown in FIG. 2 and broken lines illustrate the position of vanes 40a, 40b, 40h in the position shown in FIG. 3. Angular differences in the position for vanes 40a, 40b, 40h for FIG. 2 relative to FIG. 3 are indicated as angle $\theta_1$ for vane 40a, angle $\theta_2$ for vane 40b, and angle $\theta_8$ for vane 40h. The observed differences between angle $\theta_1$, angle $\theta_2$, and angle $\theta_8$ illustrate the vane pivoting variation attendant to maintaining the desired throat area for this example. Furthermore, for this example, it should be appreciated that a convergent orientation of vanes 40 about axis C provides the neutral thrust vector direction NV. Alternatively, vanes 40 may be oriented divergent to or generally parallel to axis C with corresponding adjustments made to vane orientations that provide other thrust vector directions. Indeed, in other embodiments, it may be desirable to change throat area in accordance with a selected schedule as thrust vector direction changes.

Nozzle throat area control may be performed in terms of many different parameters, including but not limited to geometric throat area, effective throat area, and discharge coefficient of the nozzle to name just a few. It should be understood that changes in effective throat area may not be uniform with respect to changes in the geometric throat area of the nozzle. As used herein, the "discharge coefficient" of a nozzle refers to the ratio between actual mass flow through the nozzle and the ideal or theoretically attainable fluid mass flow through the nozzle. For practical nozzle designs, the discharge coefficient is generally less than one (<1) due to the formation of boundary layers and other non-ideal conditions. The "geometric throat area" of a nozzle refers to the measured throat area of the nozzle configuration. The "effective throat area" of a nozzle refers to a nozzle area that is required to attain a desired actual mass flow rate through a given nozzle configuration and is defined by the expression:

$$\text{effective throat area} = (AFR/IFR) * GTA;$$

where AFR=actual flow rate, IFR=ideal or theoretically attainable flow rate, and GTA=geometric throat area of the nozzle. The term (AFR/IFR) is the discharge coefficient for the given nozzle. For a discharge coefficient less than one (<1), the effective throat area is less than the geometric throat area. Maintaining a generally constant geometric throat area while discharge coefficient varies with changes in vane orientation, typically results in a change in thrust vector magnitude for a constant level of working fluid supplied to the nozzle. In contrast, a generally constant effective throat area accounts for discharge coefficient changes and results in an approximately constant thrust magnitude for a constant level of working fluid supplied to the nozzle. In contrast, a generally constant effective throat area accounts for discharge coefficient changes and results in an approximately constant thrust magnitude for a constant level of working fluid supplied to the nozzle.

In one embodiment of the present invention, an approximately constant effective throat area is maintained to accommodate changes in discharge coefficient over a given profile of nozzle performance. In another embodiment, an approximately constant geometric throat area is provided. In still another embodiment, a throat area schedule is provided as a function of the discharge coefficient that may not maintain a generally constant geometric or effective throat area. In yet other embodiments, a different throat area control arrangement may be utilized as would occur to those skilled in the art or throat area control may not be desired at all.

With thrust mechanism 32, vanes 40 may be pivoted to provide a range of thrust vector directions while providing a desired degree of throat area control. Activation of one of actuators 80a, 80b causes rod 50 to rotate about axis R; however, mechanism 32 maintains rod 50 in generally the same translational position relative to axis R as it rotates thereabout. Because toothed drive members 54 are fixed to corresponding shafts 42, movement of toothed drive members 54 in response to the rotation of engaged threaded portions 58 is constrained by rotary mounting of shafts 42 relative to wall portions 66, 68 of nozzle 28 and wall portions 150a, 150b of central strut 48. Accordingly, when rod 50 is rotated, toothed drive members 54 are urged to pivot about the respective pivot axes 46a–46g in the same rotational direction (i.e., clockwise or counterclockwise) as the teeth of toothed drive members 54 are engaged by the rotating thread of threaded portions 58a–58g, respectively. As a result, vanes 40a–40g pivot with the pivoting of toothed drive members 54 fixed thereto.

By selecting different thread pitches for threaded portions 58 and differently toothed drive members 54, different degrees of pivoting of vanes 40 from one to the next may be provided, resulting in the ability to control throat area as vanes 40 are pivoted over a range of vector directions. For the illustrated example, nozzle throat area is also controlled with coupling assembly 56. As rod 50 is rotated, the engagement between flange 103 and strut 48 prevent rotation of coupling member 102 about axis R. As a result, threading 158a urges coupling member 102 to translationally move along axis R relative to rod 50. As coupling member 102 moves along rod 50, follower 126, being carried by flanges 108a, 108b of coupling member 102, moves along cam slot 122 and engages camming surface 124. As in the case of the other vane control members 52, the fixed relationship of drive member 120 of coupling assembly 56 to mounting shaft 42h and vane 42h constrains its motion. Correspondingly, a camming relationship between surface 124 and follower 126 can cause vane 40h to pivot depending on the shape of path P that slot 122 defines relative to the direction of motion of coupling member 102. In the case of slot 122, a generally constant pivot position is defined by path segment D, as labeled in FIG. 5, with other segments of path P providing different pivot angles relative to pivot axis 46h.

Vane 40h is configured with a different arrangement of vane control members 52 relative to vanes 40a–40g to trim the throat area over the pivoting range to a desired schedule. This trimming vane arrangement may be used to accommodate nonlinear changes that may be more awkward to address with toothed drive members. Consequently, for other throat area schedules, slot 122 may be provided with a different shape to provide a different trim profile with vane 40h with respect to the desired range of thrust vector directions. In fact, more than one trimming vane and corresponding coupling assembly may be utilized in alternative embodiments.

Figure 8:
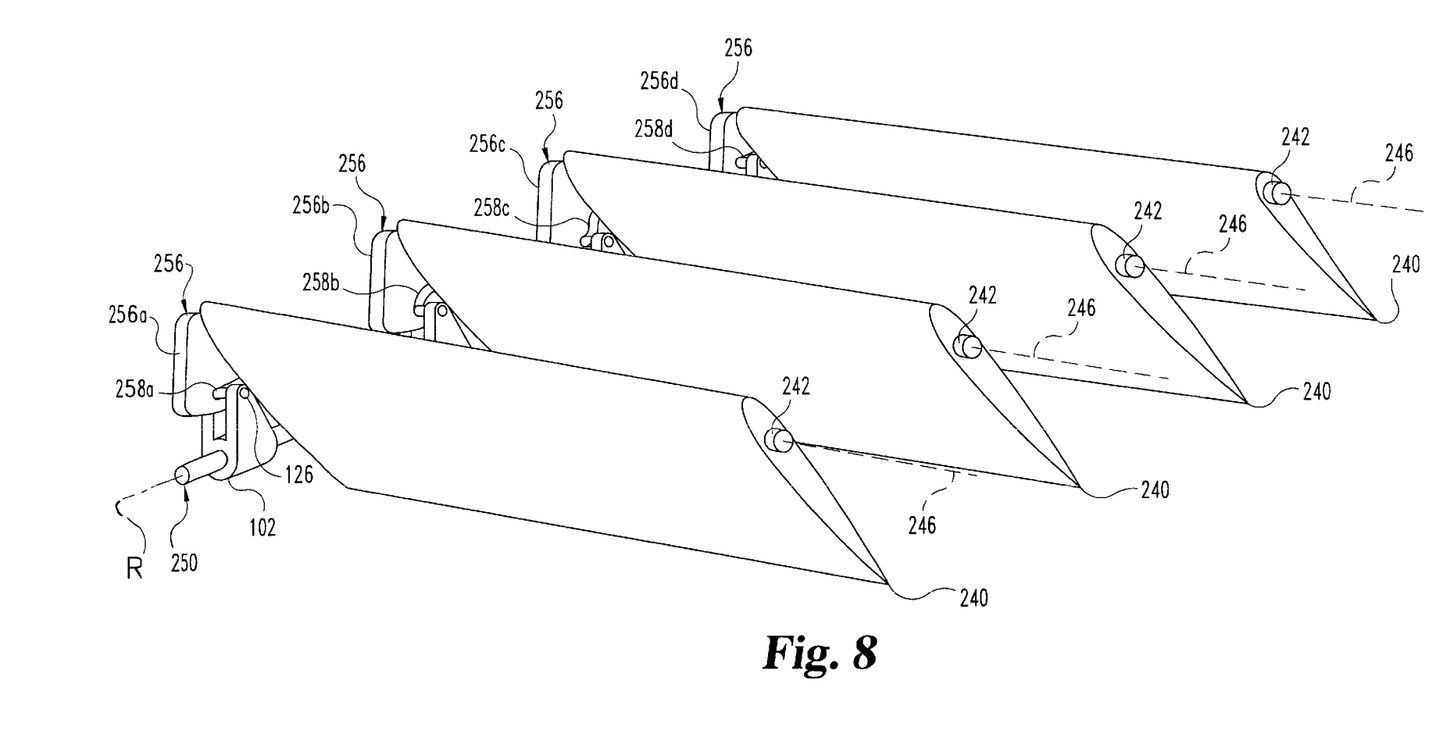
FIG. 8 is a partial perspective view of an alternative thrust vectoring mechanism for use in the aircraft of FIG. 1.

Turning to FIG. 8, a portion of an alternative embodiment utilizing multiple camming assemblies is illustrated as thrust vectoring mechanism 232. Although not shown, mechanism 232 is at least partially housed in a strut spanning an outlet of a vectoring nozzle, such as nozzle 28 of system 30 to direct working fluid being discharged therethrough. In a partial perspective view, FIG. 8 depicts four vanes 240 each having a corresponding mounting shaft 242 fixed thereto, with a corresponding pivot axis 246. Mechanism 232 includes threaded control rod 250 threaded through a number of camming assemblies 256 in the manner described for assembly 56 relative to rod 50; however, threading is not shown in FIG. 8 to preserve clarity. Each camming assembly 256 corresponds to one of vanes 240. Each camming assembly 256 includes a coupling member 102 and follower 126 as described in connection with FIGS. 5 and 7. Drive members 256a, 256b, 256c, 256d of camming assemblies 256 are each fixed to a different one of vanes 240 and each define a differently shaped cam slot 258a, 258b, 258c, 258d (collectively designated cam slots 258), respectively, that is engaged by a corresponding one of followers 126. Accordingly, with differently shaped slots 258, the degree of pivoting of each vane 240 to provide different thrust vector directions may be selected to control throat area over a given vector directional range. While control rod 250 is located below drive members 256 in mechanism 232, it should be appreciated that the arrangement may be readily adapted to the arrangement of mechanism 32 having rod 50 above the vane control members 52. Likewise, mechanism 32 may be adapted to position rod 50 below control members 52. In an alternative embodiment of aircraft 10, thrust vectoring mechanism 232 is utilized in thrust vectoring system 30 previously described to replace part or all of vanes 50, rod 50 and vane control members 52 of thrust vectoring mechanism 32.

Figure 9:
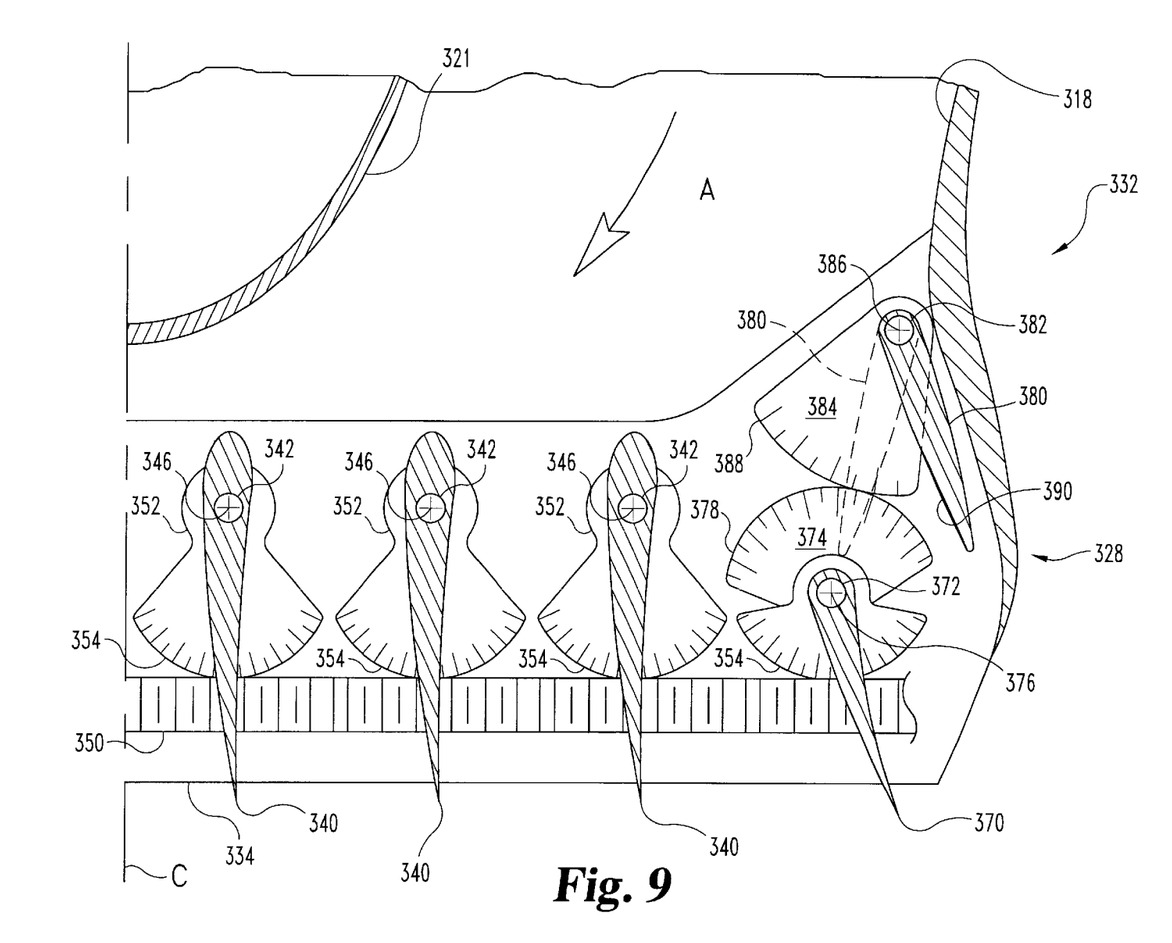
FIG. 9 is a partial sectional, side view of another alternative thrust vectoring mechanism for use in the aircraft of FIG. 1.

Nonetheless, in other embodiments, toothed driving members can be utilized to provide a desired thrust vectoring arrangement without a trimming vane or camming control assembly. Referring to the nonlimiting example of FIG. 9, two toothed thrust vectoring drive members are meshed to provide an adjustable nozzle end wall vane in thrust vectoring mechanism 332. FIG. 9 depicts a working fluid source with centerbody 321 extending into discharge passage 318 to deliver working fluid along arrow A, that exits through outlet 334 of nozzle 328; where these features are generally the same as like named features of system 30 previously described. Further, mechanism 332 may be housed in a chamber defined by a strut spanning across outlet 334 in the manner previously described for strut 48 of system 30. Also, it should be appreciated that only a right-hand half of mechanism 332, passage 318, centerbody 321, nozzle 328, and outlet 334 are illustrated in FIG. 9, the left-hand portion being generally symmetric about centerline axis C.

Mechanism 332 includes threaded drive rod 350 and vanes 340. Vanes 340 are each fixed to a corresponding mounting shaft 342. Mounting shafts 342 each have a corresponding pivot axis 346. Vanes 340 are each fixed to a respective drive member 352. Each drive member 352 defines an arcuate, toothed segment 354 that engages threading of drive rod 350. Mechanism 332 also includes outer vane 370 that is sized smaller than vanes 340. Vane 370 has mounting shaft 372 fixed thereto and corresponding pivot axis 376. Mounting shaft 372 and pivot axis 376 are positioned below shaft 342 and pivot axes 346, respectively. Vane 370 is fixed to drive member 374 that also defines toothed segment 354 engaged by rod 350. Drive member 374 further defines toothed segment 378. Mechanism 332 further includes end wall vane 380. Vane 380 is fixed to mounting shaft 282, having pivot axis 386. Vane 380 is fixed to drive member 384 that defines toothed segment 388. The teeth of segment 388 mesh with the teeth of segment 378.

Vanes 340, 370 pivot in response to rotation of rod 350 to provide different vector directions and/or control throat area in the manner previously described for drive members 54 and rod 50. Furthermore, the mesh between toothed segments 378 and 388 further causes vane 380 to rotate in a rotational direction opposite the direction of vanes 340, 370. One position of vane 380 is depicted by solid lines corresponding to one orientation between drive members 374 and 384. For this position, discharge gap 390 is defined between vanes 370, 380. However, as drive member 374 pivots in a clockwise rotational direction, drive member 384 pivots in a counter-clockwise rotational direction to move vane 380 to the alternative orientation indicated by broken lines in FIG. 9 to generally close gap 390. Consequently, throat area of nozzle 328 may be controlled by adjusting gap 390. The same arrangement of vanes 370, 380 and drive members 374, 384, respectively, may be used for the opposing end wall (not shown) as part of a symmetric application of mechanism 332. In an alternative embodiment of aircraft 10, mechanism 332 can be incorporated into system 30 in place of mechanism 32 or 232, combined therewith, or otherwise utilized as would occur to those skilled in the art.

Referring generally to FIGS. 1–9, aircraft 10 and mechanisms 32, 232, 332 are made from conventional materials known to those skilled in the art. In one embodiment, these structures are predominately manufactured from metal. In other embodiments, selected composite materials may be preferred. When lift fan 20 is of the type discharging working fluid at an elevated temperature, it should be recognized that structure exposed to the hot discharge stream will need to be constructed from materials appropriate for such elevated temperatures.

For any of mechanisms 32, 232, 332 (or their variations) interfaced with control system 80, controller 90 can be arranged to generate one or more thrust control output signals to control actuators 80a, 80b and correspondingly provide a desired vane orientation. The output signals can be a function of one or more steering signals from control 94, one or more sensor signals from sensors 96, or a combination of these. For instance, controller 90 can provide one or more actuator output signals in response to such signals to provide a stable hover mode of operation; direct aircraft 10 along a desired heading; initiate V/STOVL operation; and/or provide a smooth transition between cruise and V/STOVL operating modes. Examples of sensors signals to which controller 90 could be responsive include rate of travel; degree to which the aircraft is level, such as pitch and roll positions of the aircraft; acceleration; weight; balance; threat avoidance; and such other sensed aircraft parameters as would occur to those skilled in the art.

Taking the neutral thrust vector NV as zero degree reference point, in one more preferred embodiment of the present invention, vanes 40 of system 30 may be pivoted to provide a foremost vectoring extreme of about +30 degrees and an aftmost vectoring extreme of about −30 degrees relative thrust vector NV (and vertical axis V) to provide a thrust vector direction range of about ±30 degrees. In an even more preferred embodiment the thrust vector direction range relative to the neutral thrust vector NV (vertical axis V) is about ±45 degrees. Nonetheless, in other embodiments, the availability of thrust vector directions may be more limited. In one instance, only aft or foreword vectoring over a lesser angular range is available. Furthermore, while pivoting axes of the vanes of the present invention are illustrated to facilitate fore and aft vectoring extremes in general alignment with the longitudinal axis of aircraft 10 (i.e. axis H), alternatively, the vanes may arranged to provide a different type of directional adjustment, such as an ability to adjust aircraft roll by arranging the vane pivot axes generally perpendicular to the aircraft longitudinal axis. In different embodiments, other directional orientations may be desired. Indeed, in one variation, the nozzle is coupled to aircraft 10 to selectively rotate about axis C, providing another degree of freedom for thrust vectoring.

Many other embodiments of the present invention are envisioned. For example, vectoring mechanisms 32, 232, 332 of the present invention may include more than one set of vanes each pivoted by rotating a different drive rod. The multiple rods may be turned independent of one another. In another example, one or more trimming vanes are provided that are each pivoted by a separate actuator able to operate independently of a drive rod utilized for other vanes. In still other examples, thrust vectoring mechanisms of the present invention are provided for a passage through a different part of an aircraft that correspondingly changes its vectoring characteristics. For instance, vectoring mechanisms of the present invention may be applied to an axial discharge nozzle utilized to propel an aircraft during cruise mode operation. This nozzle may or may not include a turning hood to facilitate V/STOVL operation. Moreover, the teachings of the present invention may be utilized in aircraft other than V/STOVL types. In further examples, the rectangular shape of passage 18 can be included as part of a separable nozzle device that has a transitional portion (not shown) configured to mate with a working fluid passage of an aircraft, the number of vanes can be more or fewer, and/or vanes can be utilized in combination with other working fluid directing techniques as are known to those skilled in the art. In one alternative utilizing a working fluid at high temperature, a mixer/ejector is also incorporated into the thrust vectoring nozzle.

In other examples, vanes of the thrust vectoring mechanisms of the present invention may be additionally or alternatively adjusted by translating the respective rod along its longitudinal axis (axis R). In one such configuration, the rod need not include threading. Instead, a coupling member can be selectively connected at a desired position to translate along with the rod using other means, and toothed drive members can engage ridges or teeth defined by the rod in place of threading, engaging each other in a rack and pinion type of relationship. In other configurations providing for translational rod motion, the rod may be configured with a combination of these structural features. In still another embodiment, as an addition or alternative to a strut across the discharge passageway; vane control members, rods, and the like of the thrust vectoring mechanism are located to the side of the thrust vectoring nozzle. For this embodiment, such thrust vectoring mechanism features can be coupled to the vane mounting shafts where they extend past the passageway through the nozzle walls.

A further embodiment of the present invention includes an aircraft defining an outlet for discharging a working fluid and a plurality of vanes coupled across the outlet that are pivotable about a respective one of a plurality of pivot axes. A rod extends along a longitudinal axis and a plurality of drive members are each fixed in relation to a corresponding one of the vanes. These drive members each engage a different point along the rod or a different one of a number of rod coupling members arranged to translate along the rod's longitudinal axis in response to movement of the rod. The members each pivot the corresponding one of the vanes in a common rotational direction in response to this rod movement with each vane pivoting a different angular amount relative to its respective pivot axis.

Another embodiment includes an aircraft defining an outlet to discharge a working fluid and a thrust vectoring mechanism. This mechanism includes a rod extending along a rotational axis, one or more actuators operable to rotate the rod about the rotational axis, and four or more vanes pivotably coupled across the outlet to vector thrust produced with the working fluid. The vanes each have a respective one of a number of pivot axes that each cross the rotational axis at a different point therealong. The vanes respond to rotation of the rod about the rotational axis to pivot together in a first rotational direction.

Still another embodiment includes an aircraft defining an outlet for discharging a working fluid to produce thrust and a plurality of vanes each coupled across the outlet to pivot about a respective one of a number of pivot axes to provide thrust vectoring. Also included is a plurality of toothed drive members each fixed in relation to a corresponding one of the vanes and a rod in movable contact with each of the toothed drive members. The toothed drive members each pivot the corresponding vane in response to rod movement in a first direction with the vanes each turning a different angular amount relative to its respective pivot axis. Optionally, at least one actuator may be provided that is operable to move the rod in the first direction.

A further embodiment includes a thrust vectoring mechanism with a plurality of vanes each coupled across an outlet to provide thrust vectoring and a plurality of vane control members each corresponding to one of the vanes. A rod threadingly engages each of the vane control members spaced therealong. The vane control members each cause one of the vanes to pivot in response to movement of the rod. The mechanism may be provided in an aircraft and may include at least one actuator operable to move the rod.

A still further embodiment includes a method that comprises: providing an aircraft defining an outlet for discharging a working fluid to produce thrust; positioning a plurality of vanes across the outlet, the vanes each being pivotable about a respective one of a plurality of pivot axes; and controlling pivoting of each of the vanes by turning a rod about a rotational axis with the pivot axes of the vanes each crossing the rotational axis of the rod.

In another embodiment, a thrust vectoring mechanism includes a rod and at least four vanes. A first one of the vanes is engaged to the rod with a first toothed drive member coupled thereto. A second one of the vanes is coupled to a second toothed drive member. The first toothed drive member meshes with the second toothed drive member. Both the first and second vanes pivot in response to movement of the rod to vector thrust.

All publications, patents, and patent applications cited in this specification are herein incorporated by reference as if each individual publication, patent, or patent application were specifically and individually indicated to be incorporated by reference. The documents incorporated by reference include, but are not limited to commonly owned U.S. patent application Ser. No. 09/055,663 filed on Apr. 8, 1998 and U.S. patent application Ser. No. 09/246,426, filed on Feb. 8, 1999. While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the invention defined by the following claims are desired to be protected.

What is claimed is:

1. A combination, comprising:
   an aircraft defining an outlet to discharge a working fluid; and
   a thrust vectoring mechanism including a rod extending along a rotational axis, one or more actuators operable to rotate said rod about said rotational axis, and four or more vanes pivotably coupled across said outlet to vector thrust produced with the working fluid, said vanes each having a respective one of a number of pivot axes, said pivot axes each crossing said rotational axis at a different point therealong, said vanes being responsive to rotation of said rod about said rotational axis to pivot together in a first rotational direction.

2. The combination of claim 1, wherein said aircraft defines a generally vertical passage in communication with said outlet and further comprising a lift fan positioned in said passage to provide the working fluid.

3. The combination of claim 1, wherein said rod defines threading.

4. The combination of claim 1, wherein said thrust vector mechanism includes two actuators each operable to turn said rod in a different rotational direction.

5. The combination of claim 1, further comprising a controller responsive to one or more input signals to determine a desired thrust direction and generate one or more output signals and wherein said one or more actuators are responsive to said one or more output signals to rotate said rod to provide said desired thrust direction.

6. The combination of claim 1, wherein said outlet is generally rectangular in crosssection bounded by a first wall portion opposite a second wall portion and a third wall portion opposite a fourth wall portion, said vanes each include a mounting shaft extending from said first wall portion to said second wall portion, said thrust vector mechanism further includes a strut extending across said outlet from said third wall portion to said fourth wall portion, said strut housing said rod, at least one of said vanes is fixed in relation to a toothed drive member engaged with threading defined by said rod, at least one of said vanes is fixed to a drive member defining a cam slot engaged by a cam pin of a coupling member in contact with said rod, and said vanes are each arranged to pivot about said respective one of said pivot axes a different angular amount relative to one another when said rod is rotated.

7. The combination of claim 1, wherein said rod defines at least two portions with differently pitched threads to correspondingly pivot at least two of said vanes by different angular amounts.

8. A combination, comprising:
   an aircraft defining an outlet for discharging a working fluid to produce thrust;
   a rod;
   a plurality of vanes each coupled across said outlet to pivot about a respective one of a number of pivot axes to provide thrust vectoring; and a plurality of toothed drive members each fixed in relation to a corresponding one of said vanes, said toothed drive members being spaced along said rod and being operable to pivot each of said corresponding one of said vanes in response to movement of said rod, with said vanes each turning a different angular amount relative to said respective one of said pivot axes.

9. The combination of claim 8, wherein said rod defines threading with a first pitch for a first one of said drive members and threading with a second pitch for a second one of said drive members to correspondingly pivot a first one of said vanes fixed in relation to said first one of said drive members a first angular amount and a second one of said vanes fixed in relation to said second one of said drive members a second angular amount different than said first angular amount.

10. The combination of claim 8, wherein said aircraft defines a generally vertical passage in communication with said outlet and further comprising a lift fan positioned in said passage to provide the working fluid.

11. The combination of claim 10, wherein said outlet is generally rectangular in cross-section being bounded by a first wall portion opposite a second wall portion and a third wall portion opposite a fourth wall portion, said vanes number at least four, said drive members number at least four, said drive members are each fixed to said corresponding one of said vanes by a mounting shaft extending from said first wall portion to said second wall portion, and further comprising a strut extending across said outlet from said third wall portion to said fourth wall portion, said strut defining a chamber to house said rod and said drive members.

12. The combination of claim 8, further comprising at least one actuator arranged to rotate said rod, said rod defining a number of differently pitched threaded portions each engaged by a different one of said drive members to control throat area as said vanes are pivoted.

13. The combination of claim 8, wherein a thrust vector directional range of the vanes is at least about ±45 degrees relative to a reference axis and said outlet has a generally rectangular cross section.

14. The combination of claim 8, wherein said toothed drive members each include a plurality of generally radially spaced apart teeth with respect to said respective one of said pivot axes for said corresponding one of said vanes.

15. The combination of claim 14, wherein said vanes each include a mounting shaft and said toothed drive members are each fastened to said mounting shaft of said corresponding one of said vanes.

16. A combination, comprising:
an aircraft defining an outlet for discharging a working fluid to produce thrust;
four or more vanes pivotably coupled across said outlet to provide thrust vectoring; and
a rod rotatable to pivot said vanes in accordance with threading defined along said rod.

17. The combination of claim 16, wherein said rod defines at least two of portions with differently pitched threads to correspondingly pivot at least two of said vanes by different angular amounts.

18. The combination of claim 16, wherein said aircraft defines a generally vertical passage in communication with said outlet and further comprising a lift fan positioned in said passage to provide the working fluid.

19. The combination of claim 16, further comprising a number of toothed drive members, said toothed drive members each being fixed in relation to a corresponding one of said vanes and including a plurality of generally radially spaced apart teeth.

20. The combination of claim 16, further comprising at least one actuator to selectively rotate said rod.

21. The combination of claim 20, wherein said outlet is generally rectangular in cross-section being bounded by a first wall portion opposite a second wall portion and a third wall portion opposite a fourth wall portion, said drive member for each of said vanes is connected thereto by a mounting shaft extending from said first wall portion to said second wall portion, and further comprising a strut extending across said outlet from said third wall portion to said fourth wall portion, said strut defining a chamber to house said rod and said drive member for each of said vanes.

22. The method of claim 16, wherein a thrust vector directional range of the vanes is at least about ±45 degrees relative to a reference axis and the outlet has a generally rectangular cross section.

23. The combination of claim 16, wherein said thrust vector mechanism includes two actuators each operable to turn said rod in a different rotational direction.

24. The combination of claim 16, further comprising a controller responsive to one or more input signals to determine a desired thrust direction and generate one or more output signals, and at least one actuator responsive to said one or more output signals to rotate said rod to correspondingly pivot said vanes to provide said desired thrust direction while maintaining a desired throat area.

25. The combination of claim 24, further comprising a pilot control device operatively coupled to said controller, said device providing a steering signal corresponding to said desired thrust vector.

26. The combination of claim 16, further comprising a drive member fixed in relation to one of said vanes and a coupling member threaded on said rod, said drive member and said coupling member being engaged in a camming relationship.

27. A combination, comprising:
an aircraft defining a n outlet for discharging a working fluid to produce thrust;
a plurality of vanes each coupled across said outlet to provide thrust vectoring;
a plurality of vane control members each corresponding to one of s aid vanes; and
a rod having a longitudinal axis and threadingly engaging each of said vane control members spaced therealong, said vane control members each causing a corresponding one of said vanes to pivot in response to movement of said rod.

28. The combination of claim 27, wherein said rod includes threading and said vane control members include at least one coupling member threaded on said rod to move along said rod as said rod is rotated.

29. The combination of claim 28, further comprising a follower in the form of a pin or roller engaged to said coupling member.

30. The combination of claim 27, wherein said aircraft defines a generally vertical passage in communication with said outlet and further comprising a lift fan positioned in said passage to provide the working fluid.

31. The combination of claim 27, wherein said outlet is generally rectangular in cross-section being bounded by a first wall portion opposite a second wall portion and a third wall portion opposite a fourth wall portion, said drive member for each of said vanes is connected thereto by a mounting shaft extending from said first wall portion to said second wall portion, and further comprising a strut extending across said outlet from said third wall portion to said fourth wall portion, said strut defining a chamber to house said rod and said vane control members.

32. The combination of claim of claim 27, wherein a thrust vector directional range of the vanes is at least about ±45 degrees relative to a reference axis and said outlet has a generally rectangular cross section.

33. The combination of claim 27, wherein said rod includes threading and said vane control members include a number of coupling members each threaded on said rod to move along said rod as said rod is rotated, a number of followers each coupled to a different one of said coupling members, and a number of drive members each defining a cam slot engaged by a different one of said followers.

34. The combination of claim 33, wherein a first one of said drive members defines a first cam pathway and a second one of said drive members defines a second cam pathway having a different shape than said first cam pathway.

35. The combination of claim 27, further comprising a controller responsive to one or more input signals to determine a desired thrust direction and generate one or more output signals and at least one actuator responsive to said one or more output signals to rotate said rod to correspondingly pivot said vanes to provide said desired thrust direction while maintaining a desired throat area.

36. The combination of claim 27, wherein said rod includes at least two portions with differently pitched threads to correspondingly pivot at least two of said vanes by different angular amounts.

37. A method, comprising:
   providing an aircraft defining an outlet for discharging a working fluid to produce thrust;
   positioning a plurality of vanes across the outlet, the vanes each being pivotable about a respective one of a plurality of pivot axes; and
   controlling pivoting of each of the vanes by turning a rod about a rotational axis, the pivot axes of the vanes each crossing the rotational axis of the rod.

38. The method of claim 37, wherein at least one of the vanes is coupled to the rod by a toothed drive member.

39. The method of claim 37, wherein at least one of the vanes is coupled to the rod by threading.

40. The method of claim 37, further comprising:
   determining a throat area schedule for the vanes in relation to a range of thrust vector directions; and
   pivoting each of the vanes a different angular amount relative to one another in accordance with the schedule.

* * * * *